(12) United States Patent
Nishio et al.

(10) Patent No.: US 7,920,659 B2
(45) Date of Patent: Apr. 5, 2011

(54) WIRELESS COMMUNICATION APPARATUS AND WIRELESS COMMUNICATION METHOD

(75) Inventors: Akihiko Nishio, Kanagawa (JP); Katsuhiko Hiramatsu, Kanagawa (JP); Fumiyuki Adachi, Miyagi (JP); Kazuaki Takeda, Miyagi (JP); Hiromichi Tomeba, Miyagi (JP)

(73) Assignee: Panasonic Corporation, Osaka (JP)

( * ) Notice: Subject to any disclaimer, the term of this patent is extended or adjusted under 35 U.S.C. 154(b) by 643 days.

(21) Appl. No.: 11/912,476

(22) PCT Filed: Apr. 24, 2006

(86) PCT No.: PCT/JP2006/308570
§ 371 (c)(1),
(2), (4) Date: Jan. 24, 2008

(87) PCT Pub. No.: WO2006/115246
PCT Pub. Date: Feb. 11, 2006

(65) Prior Publication Data
US 2009/0060100 A1    Mar. 5, 2009

(30) Foreign Application Priority Data
Apr. 25, 2005 (JP) ................................. 2005-126657

(51) Int. Cl.
*H04L 27/06* (2006.01)
(52) U.S. Cl. .......................................................... 375/344
(58) Field of Classification Search .................. 375/260, 375/285, 316, 340, 342, 346, 348, 350; 370/208, 370/210
See application file for complete search history.

(56) References Cited

U.S. PATENT DOCUMENTS

| | | | |
|---|---|---|---|
| 6,912,258 B2 | 6/2005 | Birru | |
| 7,075,967 B2 * | 7/2006 | Struhsaker et al. | 375/130 |
| 7,308,033 B2 * | 12/2007 | Yu et al. | 375/260 |
| 7,388,910 B2 * | 6/2008 | McKown | 375/232 |
| 2002/0034214 A1 * | 3/2002 | Okada et al. | 375/147 |
| 2005/0219998 A1 * | 10/2005 | Kumar et al. | 370/203 |
| 2005/0259727 A1 | 11/2005 | Benvenuto et al. | |

(Continued)

FOREIGN PATENT DOCUMENTS
JP    2004-349889    12/2004
(Continued)

OTHER PUBLICATIONS
International Search Report dated Jul. 11, 2006.
(Continued)

*Primary Examiner* — Khanh C Tran
(74) *Attorney, Agent, or Firm* — Dickinson Wright PLLC

(57) ABSTRACT

A wireless communication apparatus capable of enhancing the transmission efficiency, while maintaining a good BER characteristic. In this apparatus, a setting part (13) sets, based on the maximum delay amount of a delayed wave and also based on the expansion of impulse response of FDE, an FFT part (14) to establish an FFT section of Nc symbol, and also sets a selecting part (17) to establish a selection section of Nc−2M−Δ symbol that is shorter than the FFT section. The setting part (13) also sets the start points of FFT and selection sections established at this time for such timings that they are shifted by Nc−2M−Δ symbol from the start points of the FFT and selection sections previously established. It should be noted that the maximum delay amount of the delayed wave is Δ symbol, the expansion of impulse response of FDE is plus/minus M symbols, and the symbol block length is Nc.

9 Claims, 7 Drawing Sheets

U.S. PATENT DOCUMENTS

| | | | |
|---|---|---|---|
| 2006/0172713 A1* | 8/2006 | Suzuki et al. | 455/103 |
| 2007/0097851 A1 | 5/2007 | Adachi | |
| 2007/0217526 A1* | 9/2007 | Park et al. | 375/260 |

FOREIGN PATENT DOCUMENTS

| | | |
|---|---|---|
| WO | 200205505 | 1/2002 |
| WO | 2004021657 | 3/2004 |

OTHER PUBLICATIONS

G. Kadel, "Diversity and equalization in frguency domain—A robust and flexible receiver technology for broadband mobile communication systems," Vehicular Technology Conference, 1997 IEEE 47$^{th}$, vol. 2, pp. 894-898.

D. Falconer, et al. "Frequency domain equalization for single-carrier broadband wireless systems," IEEE Communications Magazine, vol. 40, pp. 58-66, Apr. 2002.

Japanese Office Action dated Jan. 11, 2011.

I. Martoyo, et al., "Low Complexity CDMA Downlink Receiver Based on Frequency Domain Equalization," IEEE Vehicular Technology Conference, Oct. 2003, vol. 2, pp. 987-991.

\* cited by examiner

WIRELESS COMMUNICATION APPARATUS AND WIRELESS COMMUNICATION METHOD

TECHNICAL FIELD

The present invention relates to a radio communication apparatus and a radio communication method.

BACKGROUND ART

Looking toward next-generation mobile communication systems, various studies have been conducted on radio transmission schemes suitable for high-speed packet transmissions capable of achieving data rates over 100 Mbps. Broadband is necessary for the frequency band used for such high-speed transmission, and the use of a bandwidth to the extent of 100 MHz has been studied.

It is known that, when this kind of broadband transmission is performed in mobile communications, a communication channel becomes a frequency selective channel comprised of a plurality of paths having different delays. That is, in broadband transmission for mobile communications, ISI (InterSymbol Interference), which refers to the interference that a preceding symbol causes against the following symbol, and BER (Bit Error Rate) characteristics deteriorate. In addition, the frequency selective channel refers to a channel where the channel transfer function varies within a frequency bandwidth, and the spectrum of the received signal via such a channel is distorted.

A technique to remove the influence of ISI and improve BER characteristics relates to the equalization technology. Especially, MLSE (Maximum Likelihood Sequence Estimation) is known as one of time domain equalization techniques. However, in MLSE, when the number of paths increases, the configurations of equalizers become more complex, and the amount of calculation required for the equalization increases exponentially. Consequently, gaining attention recently directs toward FDE (Frequency Domain Equalization) (see, for example, Patent Document 1) as an equalization technique where the configuration of the equalizer does not rely on the number of paths.

In FDE, received signal blocks are broken into orthogonal frequency components by FFT (fast Fourier transform), and, after the orthogonal frequency components are multiplied by equalization weights approximating the reciprocal of the channel transfer function, the multiplied frequency components are converted into a time domain signal by IFFT (inverse fast Fourier transform). This FDE makes it possible to compensate for the distortion of the spectrum of the received signal, consequently reducing ISI and improving BER characteristics. In addition, as for equalization weights, MMSE (Minimum Mean Square Error) weights, which minimize the minimum mean square error between the frequency components after equalization and transmission signal components, provide optimal BER characteristics. Patent Document 1: "Frequency domain equalization for single-carrier broadband wireless systems", D. Falconer, S. L. Ariyavistakul, A. Benyamin-Seeyar, and B. Eidson, IEEE Communications Magazine., vol. 40, pp. 58-66, April 2002.

DISCLOSURE OF THE INVENTION

Problems to be Solved by the Invention

However, according to the technique disclosed in patent document 1, the received signal needs to be processed as a signal in which an FFT block length repeats. As a result, the transmitting side attaches the same signal as the tail part of a symbol block, to the beginning of the symbol block, and provides a guard interval ("GI"). When a GI is provided as such, a data transmission rate decrease equaling the GI length results. If, for example, the symbol block length is Nc symbols and the GI length is Ng symbols, the data transmission rate is reduced to Nc/(Nc+Ng).

It is therefore an object of the present invention to provide a radio communication apparatus and a radio communication method that maintain good BER characteristics and improve transmission efficiency.

The radio communication apparatus of the present invention employs a configuration including: a fast Fourier transform section that performs a fast Fourier transform on a received signal without a guard interval and acquires a plurality of frequency components; an equalization section that performs a frequency domain equalization on the frequency components; an inverse fast Fourier transform section that performs an inverse fast Fourier transform on the frequency components after the frequency domain equalization and acquires a signal sequence; and a selecting section that selects a part of the signal sequence.

Means for Solving the Problem

Advantageous Effect of the Invention

According to the present invention, it is possible to maintain good BER characteristics and improve transmission efficiency.

BEST MODE FOR CARRYING OUT THE INVENTION

Embodiments of the present invention will be explained below in detail with reference to the accompanying drawings.

Embodiment 1

According to this embodiment, FDE is performed on a signal transmitted in single carrier.

First, the principles of operation of FDE according to this embodiment will be explained below.

Figure 1:
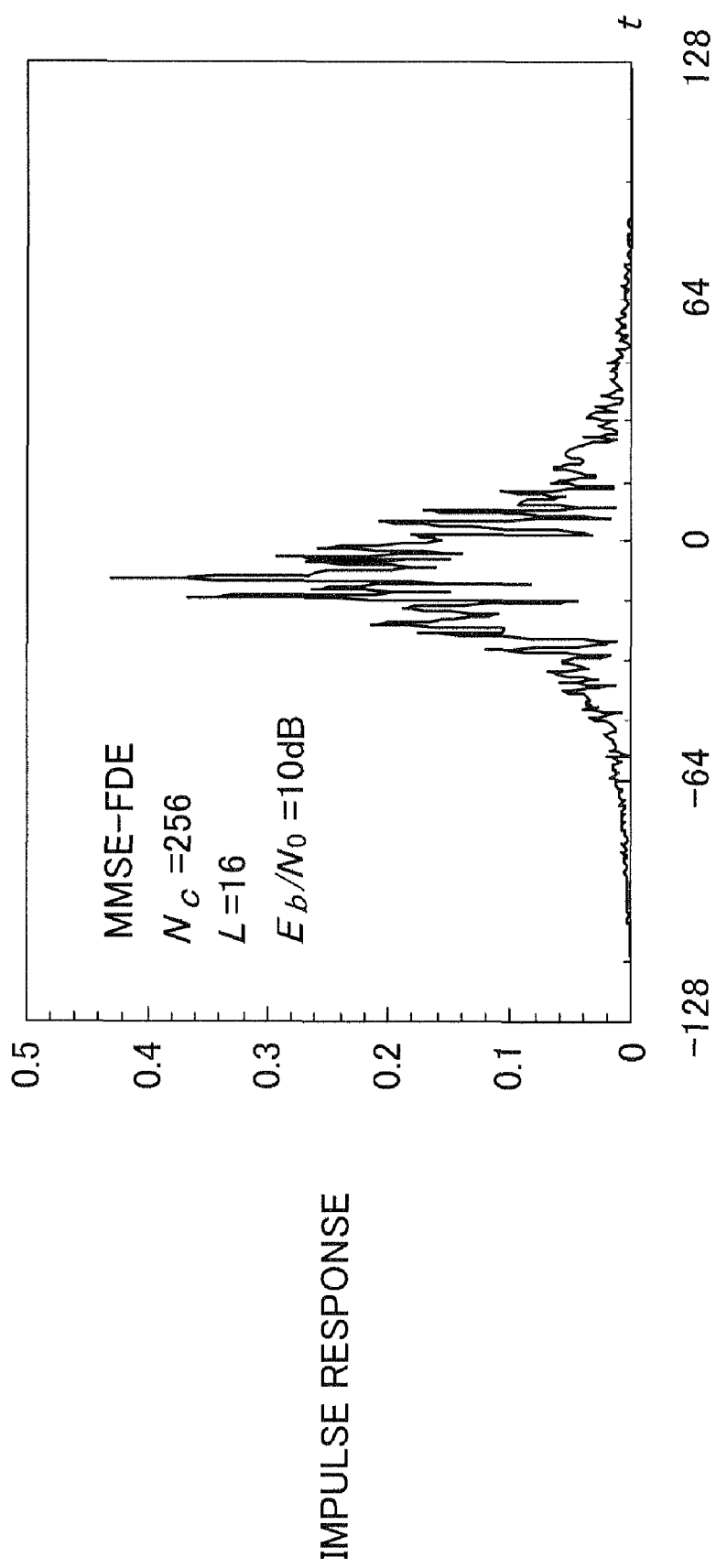
FIG. 1 shows an example of the FDE impulse response.
Figure 2:
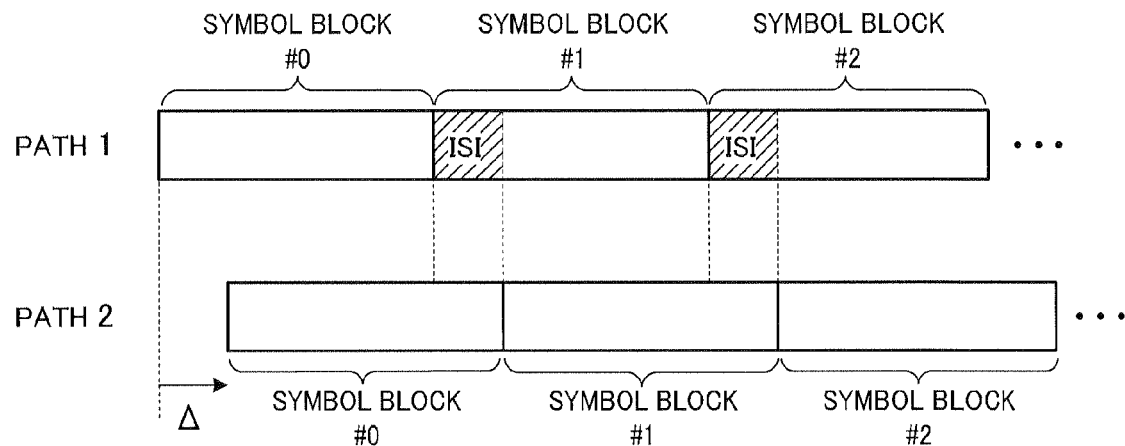
FIG. 2 illustrates ISI.
Figure 3:
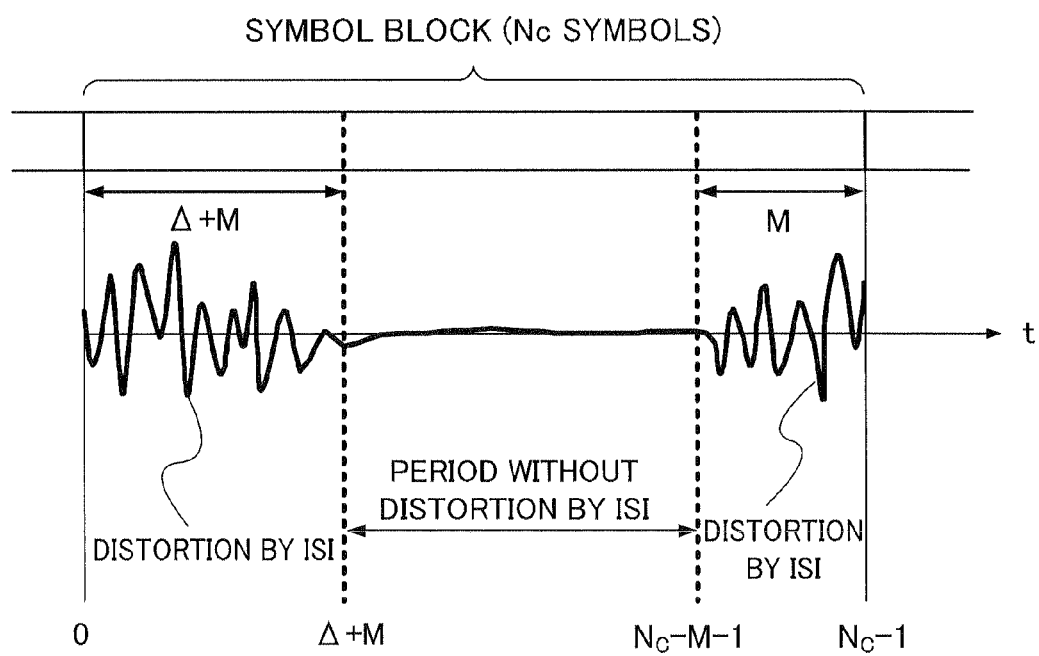
FIG. 3 shows distortion by ISI.
Figure 4:
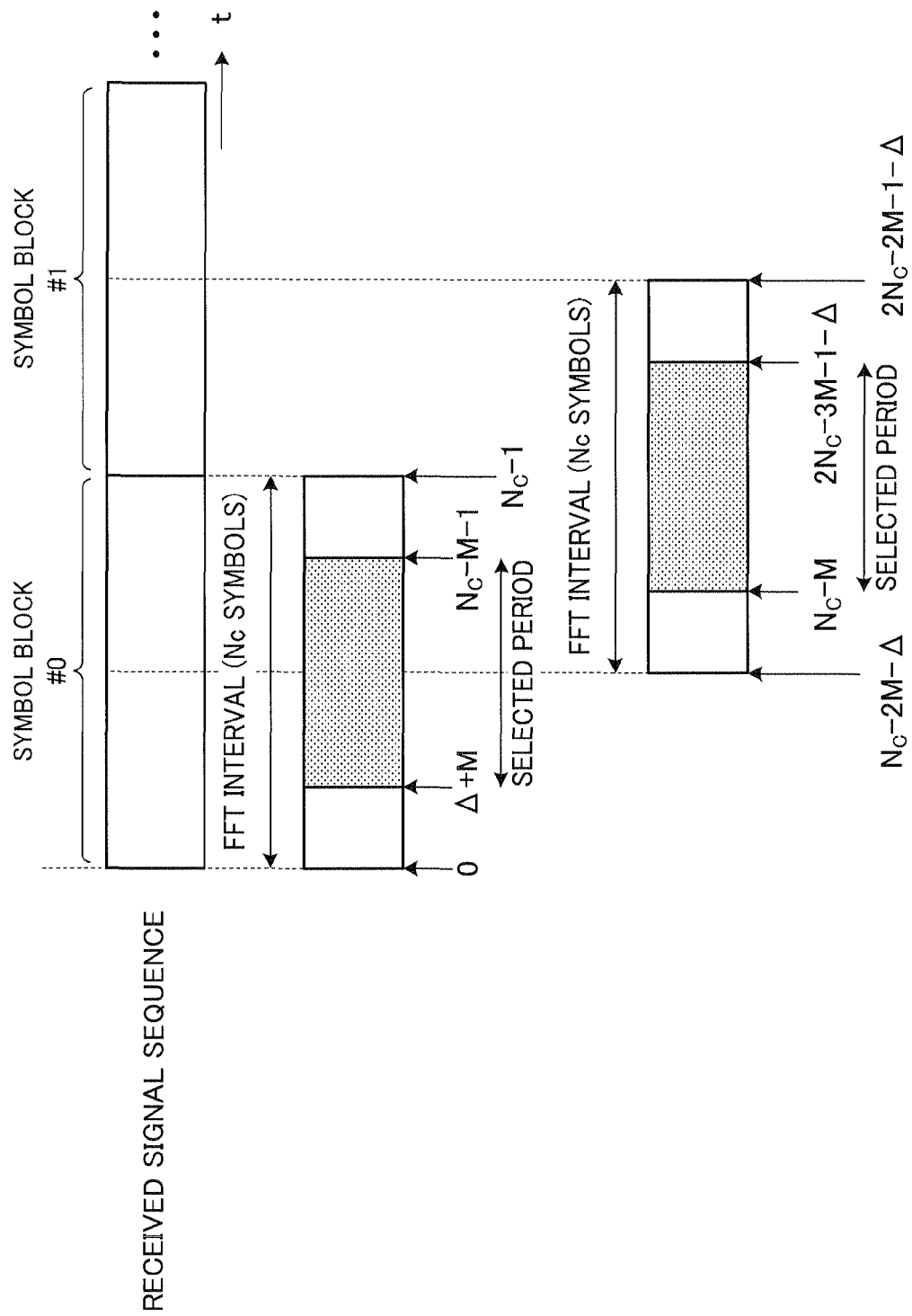
FIG. 4 illustrates the operation of FDE according to Embodiment 1 of the present invention.

In FDE, when the block length of a symbol block is Nc symbols, Nc equalization weights $w(k)$ ($k=0$ to $Nc-1$) are used. That is, FDE is equivalent to the linear filter processing that the transfer function is $w(k)$ ($k=0$ to $Nc-1$). FIG. 1 shows an example of a linear filter impulse response derived from the transfer function of MMSE-FDE. Here, the symbol block length Nc is 256 symbols, and the number of paths L is 16. It is obvious from FIG. 1 that the FDE impulse response is concentrated in a narrow range around the center of time t=0. In addition, the FDE of the present invention does not require GIs. Consequently, when there are a plurality of paths having different delays in the channel, as shown in FIG. 2, ISI from the tail part of the preceding symbol block is produced at the beginning of the each symbol block. For example, the maximum value of delay spread (the maximum delay amount of a delay wave) between L paths is Δ symbols, the ISI period is a Δ symbol period from the beginning of the symbol block. Consequently, if ISI of a Δ symbol period is produced at the beginning of the symbol block, correct frequency components are not acquired in FFT, and, distortion is caused in the signal sequence after FDE. In addition, this distortion by ISI spreads larger in the time domain, equaling the impulse response shown in FIG. 1. In other words, this distortion by ISI is little enough to ignore at distant positions in the time domain from ISI period. That is, for example, if the impulse response spreads over ±M symbols as shown in FIG. 1, the ISI distortion shown in FIG. 3 results, and, in each symbol block after FDE, the distortion in the symbol period between t=Δ+M and t=Nc−M−1 is little enough to ignore. In other words, as shown in FIG. 4, if, in each symbol block after FDE, by selecting just the signal of the symbol period between t=Δ+M and t=Nc−M−1, the signal after the equalization can be acquired without distortion even though GI is not attached to each symbol block. Further, to acquire a continuous signal after the equalization, the starting point of the FFT interval is shifted by Nc−2M−Δ symbols. By setting a plurality of overlapping FFT intervals and by setting the selected period shorter than FFT interval, in FDE performed on the signal without a GI, a continuous signal without distortion can be acquired.

By this means, the present invention makes possible FDE that GI does not require. As a result, it is no longer necessary to attach the GI at the transmitting side, so that transmission efficiency is improved.

Figure 5:
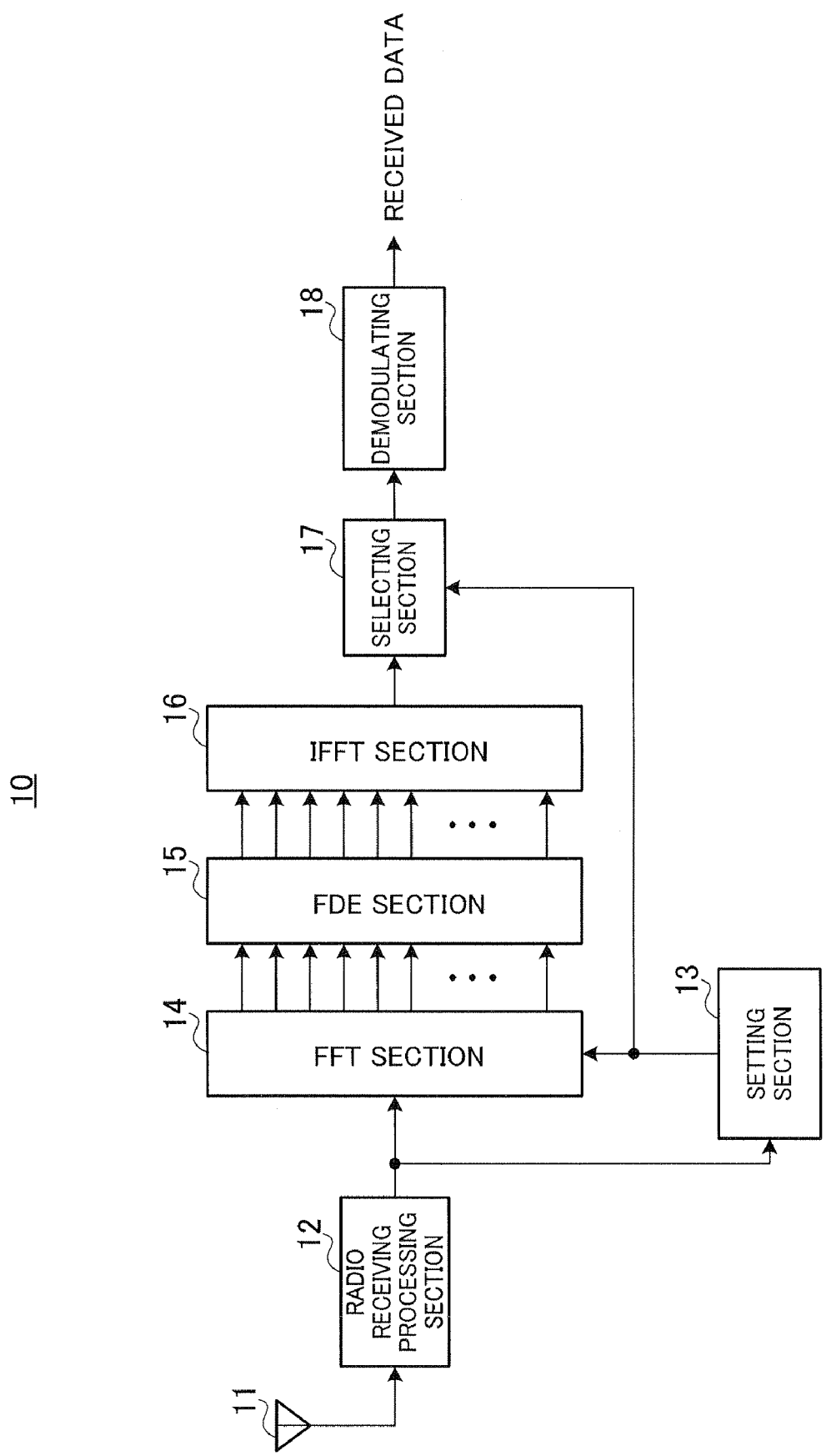
FIG. 5 shows a block configuration diagram of the radio communication apparatus according to Embodiment 1 of the present invention.

Next, the radio communication apparatus in this embodiment will be explained below. The configuration of the radio communication apparatus 10 according to this embodiment is shown in FIG. 5.

The radio communication apparatus of transmitting side makes radio transmissions of a single carrier signal without an attachment of a GI, to radio communication apparatus 10 of the receiving side.

Radio receiving processing section 12 receives the single carrier signal without a GI via antenna 11 and performs radio processing such as down-conversion on this single carrier signal. Further, radio receiving processing section 12 also outputs the received signal sequences, acquired by sampling the received signal after radio processing for every symbol period, to selecting section 13 and FFT section 14.

As shown in FIG. 4, based on the maximum delay amount of the delay wave and the FDE impulse response spread, setting section 13 sets an FFT interval of Nc symbols in FFT section 14 and sets a selected period of Nc−2M−Δ symbol, which is shorter than the FFT interval, in selecting section 17. Further, as shown in FIG. 4, setting section 13 sets the starting point of the FFT interval and the starting point of the selected period that are currently set to the timing of being shifted by Nc−2M−Δ symbol from the starting point of the FFT interval and the starting point of the selected period that are previously set. In this way, by sequentially setting the FFT interval and the selected period, a plurality of the overlapping FFT intervals having an Nc symbol length can be set, and the symbol at the rear end of the previously set selected period and the symbol at the beginning of the currently set selected period can be continued.

Here, the maximum delay amount of the delay wave is defined as Δ symbol and the FDE impulse response spread is defined as ±M symbol as explained above.

In the FFT interval set by setting section 13, FFT section 14 performs Nc size FFT on the received signal sequence without a GI and acquires a plurality of frequency components. To be more specific, FFT section 14 sequentially extracts symbol blocks having the Nc symbols length from the received signal sequence and breaks the symbol blocks into Nc orthogonal frequency components by performing an Nc-point FFT. These pluralities of frequency components are outputted to FDE section 15 in parallel. That is, the signal to be inputted to FDE section 15 is subject to FFT over the FFT interval set based on the maximum delay amount of the delay wave and the FDE impulse response spread.

FDE section 15 multiplies the frequency components by MMSE equalization weights and performs FDE on each frequency component. Each frequency component after FDE is outputted to IFFT section 16 in parallel. As for MMSE equalization weights, for example, a technique explained in "The transmission performance with space and frequency-domain process for DS-CDMA", TAKEDA et al., Technical report of IEICE., RCS2003-33, pp. 21 to 25, 2003-05, is used.

IFFT section 16 performs IFFT on each frequency component after FDE and acquires a signal sequence after FDE. To be more specific, by performing an Nc-point IFFT, IFFT section 16 converts the frequency components into a signal sequence of Nc symbols. The signal sequence of Nc symbols is outputted to selecting section 17.

Selecting section 17 selects a part of the signal sequence of Nc symbols, that is, the signal sequence in the selected period set by selecting section 13 and outputs the part of the signal sequence to demodulating section 18. In other words, in the signal after FDE, selecting section 17 selects the signal in the selected period set based on the maximum delay amount of the delay wave and the FDE impulse response spread. In this way, by selecting the part of the signal, the number of times of FDE performing can be minimized and only the signal without the influence of interference can be extracted.

Demodulating section 18 demodulates the signal sequences sequentially selected by selecting section 17 and acquires received data.

By repeating the above described processing, it is possible to acquire a continuous signal without distortion after FDE.

Figure 6:
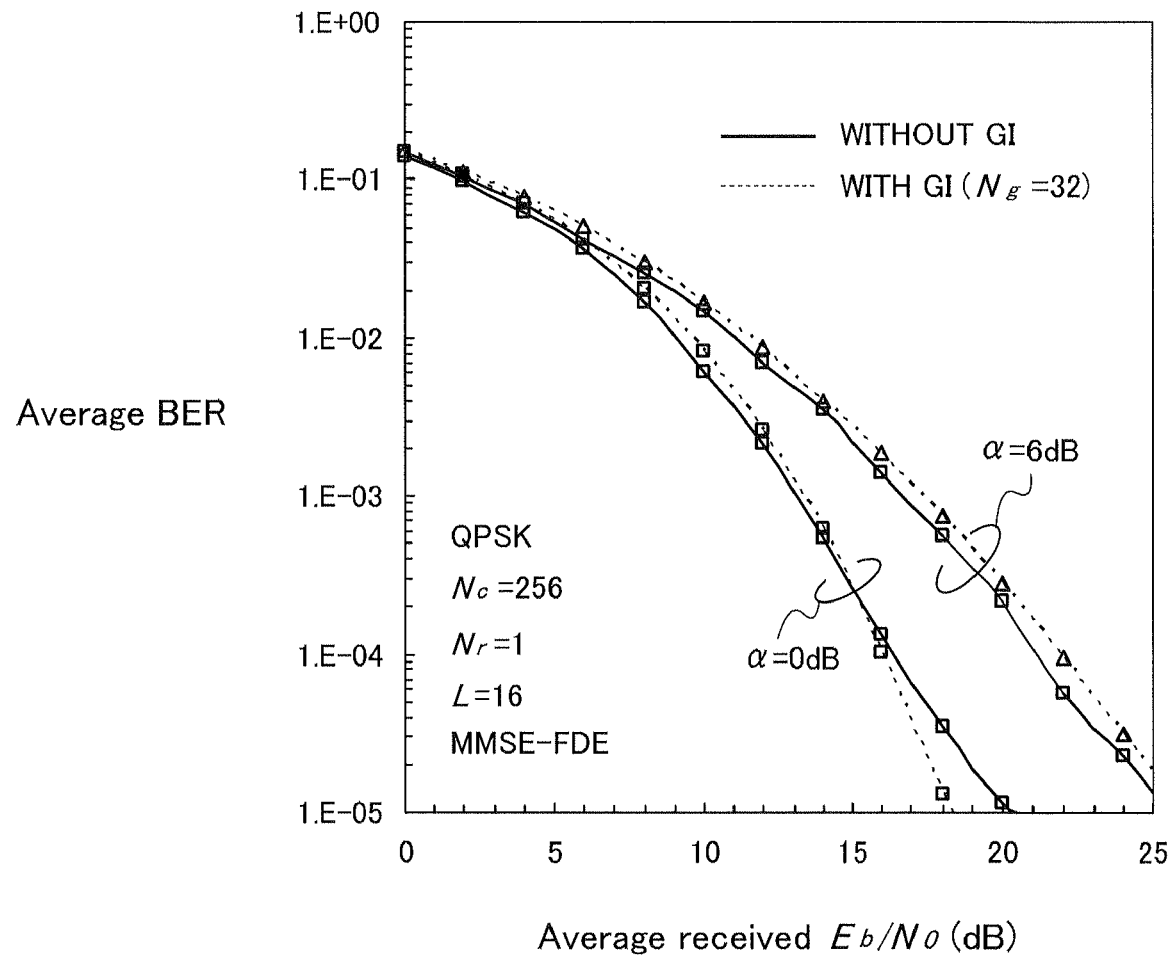
FIG. 6 is a BER characteristic graph of the radio transmission apparatus according to Embodiment 1 of the present invention.

Next, the BER characteristics of the radio communication apparatus having the above configuration will be shown in FIG. 6. These BER characteristics are derived from computer simulation using an exponential decay model where the number of antennas Nr=1 and the number of propagation paths L=16, and using two exponential decay coefficients α=0 dB and 6 dB. According to FIG. 6, the solid lines (without GI) show the BER characteristics of the radio communication apparatus of this embodiment, and the broken lines (with GI) show the BER characteristics of a conventional radio communication apparatus that performs FDE on signals with GI. From FIG. 6, according to this embodiment, the radio communication apparatus maintains good BER characteristics, similar to the conventional radio communication apparatus. Particularly, in the case of BER=1.E−0.03, compared to the conventional BER characteristics, the BER characteristics improve 0.5 dB when α is 0 dB and improve 1 dB when α is 6 dB.

In this way, according to this embodiment, by performing FDE on signals without a GI, good BER characteristics can be maintained. That is, the transmitting side does not need to attach a GI to the transmission signals, and so, transmission efficiency is improved. Consequently, good BER characteristics are maintained and transmission efficiency is improved. Further, although the receiving side conventionally needs to use the same FFT size as the symbol block set by the transmitting side, in this embodiment, the FFT interval can be set by the receiving side, so that the radio communication apparatus of the receiving side can be designed with flexibility.

Embodiment 2

The principles of operation of FDE according to this embodiment are basically the same as FDE in Embodiment 1. However, in this embodiment, FDE is performed on signals transmitted by OFDM (Orthogonal Frequency Division Multiplexing).

To extract subcarrier signals from an OFDM symbol, a signal having an OFDM symbol length is necessary. In other words, only one missing sample in an OFDM symbol makes it not possible to extract the subcarrier signals correctly.

Figure 7:
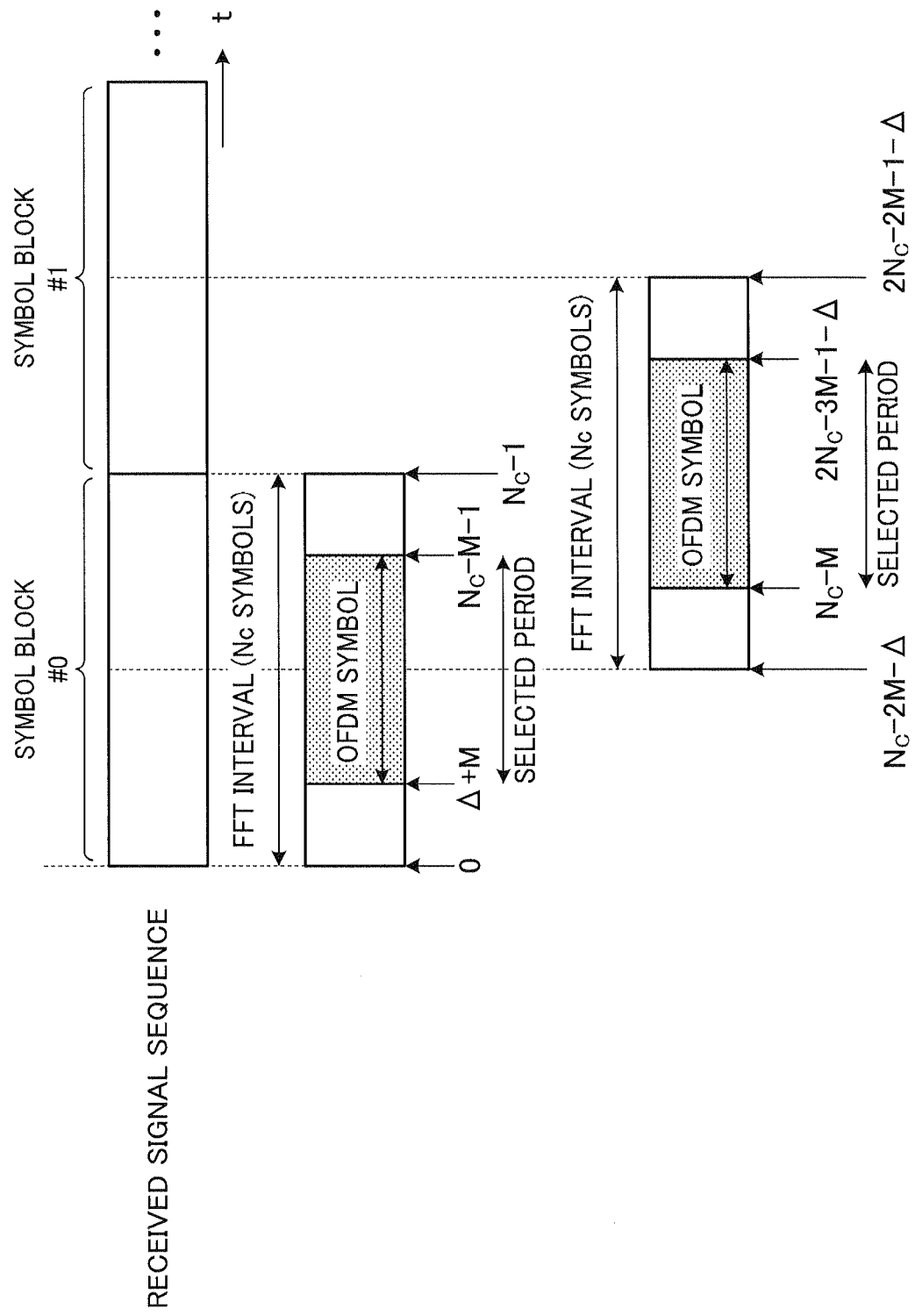
FIG. 7 illustrates the operation of FDE according to Embodiment 1 of the present invention.

As shown in FIG. 7 of this embodiment, the selected period (Nc−2M−Δ symbol) is set equally or more than 1 OFDM symbol length Ns. In addition, from Nc−2M−Δ>=Ns, the FFT interval Nc is set Nc>=Ns+2M+Δ.

Figure 8:
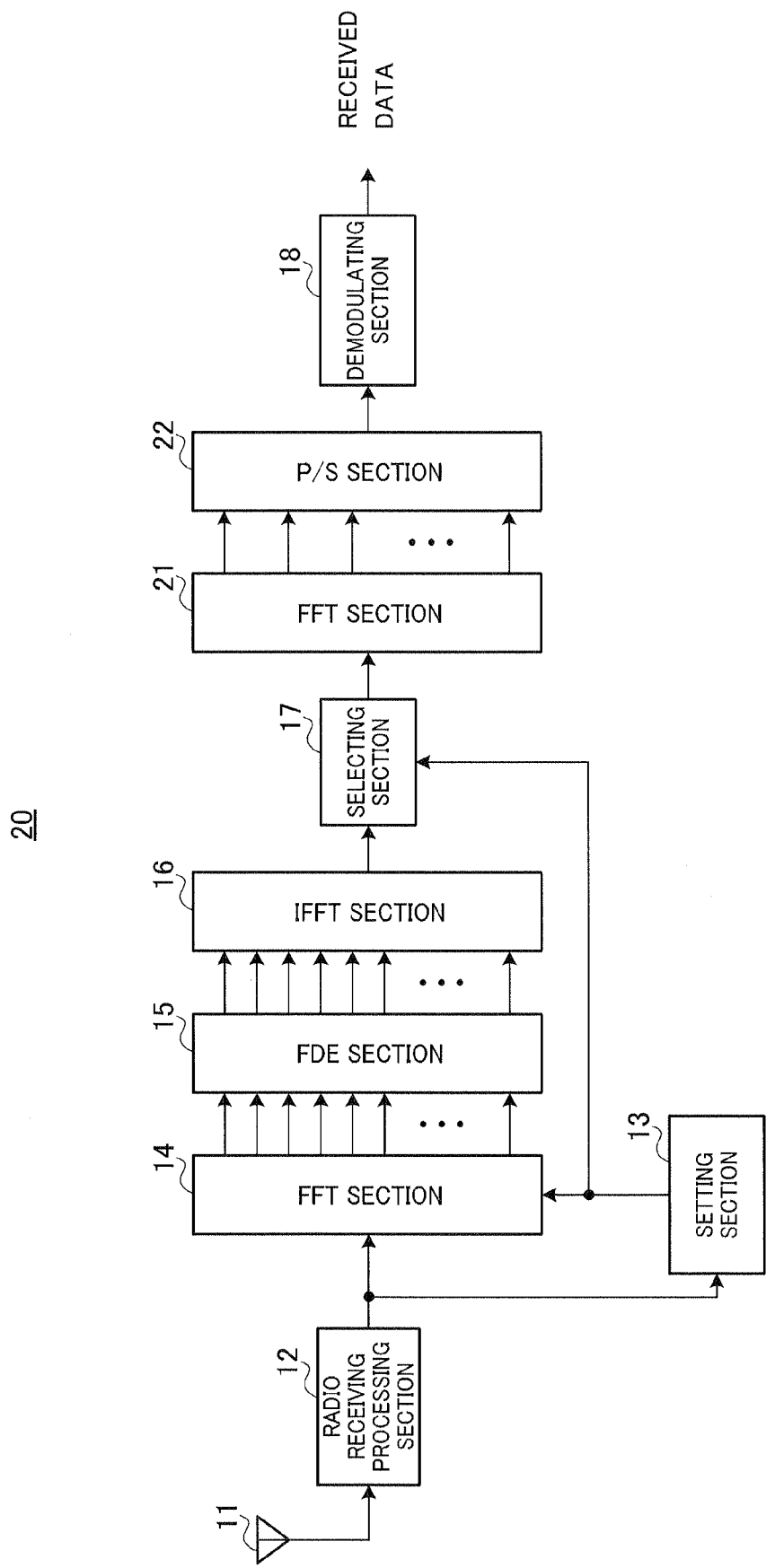
FIG. 8 shows a block configuration diagram of the radio communication apparatus according to Embodiment 2 of the present invention.

Next, the radio communication apparatus according to this embodiment will be explained below. FIG. 8 shows the configuration of the radio communication apparatus 20 according to this embodiment. Explanations of the same configuration as the radio communication apparatus (FIG. 5) according to Embodiment 1 will be omitted.

The radio communication apparatus of the transmitting side makes a radio transmission of an OFDM signal without an attachment of GI, to radio communication apparatus 20 of the receiving side.

Radio receiving processing section 12 receives the OFDM signal without a GI via antenna 11 and performs radio processing such as down-conversion on the OFDM signal. Radio receiving processing section 12 also outputs the received signal sequence acquired by sampling the received signal after radio processing for each symbol period, to selecting section 13 and FFT section 14.

As shown in FIG. 7, based on the maximum delay amount of the delay wave and the FDE impulse response spread, setting section 13 sets an FFT interval of Nc =Ns+2M+Δ samples in FFT section 14 and sets a selected period of Ns symbols in selecting section 17.

In the FFT interval set by setting section 13, FFT section 14 performs FFT of Nc=Ns+2M+Δ size on the received signal sequence without a GI and acquires a plurality of frequency components.

FFT section 21 performs FFT on the signal sequence of Ns symbols selected by selecting section 17 and acquires the subcarrier signals. FFT section 21 outputs the signal for the subcarriers in parallel to P/S (parallel-to-serial conversion) section 22. Here, the FFT size in FFT section 21 is the OFDM symbol length Ns. In other words, the FFT interval in FFT section 21 matches the period of the OFDM symbol.

P/S section 22 converts the subcarrier signals inputted in parallel into series and outputs the result to demodulating section 18.

By this means, with an OFDM signal, the present embodiment provides the same advantage as in Embodiment 1.

Further, Δ, M and Nc in the above embodiments may be adaptively changed according to channel conditions including delay spread.

In addition, to convert signals from time domain to frequency domain, frequency conversion methods other than FFT may be used, for example, DFT (Discrete Fourier Transform).

An FFT interval is also referred to as an FFT window.

The present invention is not limited to MMSE-FDE, but is also applicable to other FDEs, for example, ZF-FDE.

In addition, the present invention is applicable to other digital transmission schemes using FDE (including MC-CDMA, DS-CDMA, and IFDMA). For example, when the present invention is applied to third generation mobile communication schemes (W-CDMA, CDMA2000 and so on), FDE can be implemented without changing the signal format, and so transmission characteristics improve.

The radio communication apparatus of the above embodiments may be employed in a radio communication mobile station apparatus and a radio communication base station apparatus used in mobile communication systems. Radio communication mobile station apparatus may be referred to as "UE" and radio communication base station apparatus may be referred to as "Node B".

For example, although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-126657, filed on Apr. 25, 2005, the entire content of which is expressly incorporated by reference herein.

INDUSTRIAL APPLICABILITY

The present invention is applicable, for example, to mobile communication systems.

The invention claimed is:

1. A radio communication apparatus, comprising:
a fast Fourier transform section that performs a fast Fourier transform on a received signal without a guard interval and acquires a plurality of frequency components;
an equalization section that performs a frequency domain equalization on the frequency components;
an inverse fast Fourier transform section that performs an inverse fast Fourier transform on the frequency components after the frequency domain equalization and acquires a signal sequence; and
a selecting section that selects a part of the signal sequence.

2. The radio communication apparatus according to claim 1, further comprising;
- a setting section that sets a fast Fourier transform interval based on a maximum delay amount of a delay wave and an impulse response spread of the frequency domain equalization, wherein
- the fast Fourier transform section performs the fast Fourier transform over the fast Fourier transform interval.

3. The radio communication apparatus according to claim 1, further comprising:
- a setting section that sets a selected period based on a maximum delay amount of a delay wave and an impulse response spread of the frequency domain equalization, wherein
- the selecting section selects the part of the signal sequence in the selected period.

4. The radio communication apparatus according to claim 1, further comprising:
- a setting section that sets a plurality of overlapping intervals of fast Fourier transform and sets a selected period shorter than the fast Fourier transform intervals, wherein:
- the fast Fourier transform section performs the fast Fourier transform over a fast Fourier transform interval; and
- the selecting section selects the part of the signal sequence in the selected period.

5. The radio communication apparatus according to claim 1, wherein:
- the received signal comprises an orthogonal frequency division multiplexing signal;
- the radio communication apparatus further comprises a setting section that sets a selected period that equals a symbol length of the orthogonal frequency division multiplexing signal; and
- the selecting section selects the part of the signal sequence in the selected period.

6. A radio communication mobile station apparatus comprising the radio communication apparatus according to claim 1.

7. A radio communication base station apparatus comprising the radio communication apparatus according to claim 1.

8. A radio communication method, comprising:
- performing, by an integrated circuit, a fast Fourier transform on a received signal without a guard interval and acquiring a plurality of frequency components;
- performing a frequency domain equalization on the frequency components;
- performing an inverse fast Fourier transform on the frequency components after the frequency domain equalization and acquiring a signal sequence; and
- selecting a part of the signal sequence.

9. The radio communication method according to claim 8, further comprising:
- setting a selected period based on a maximum delay amount of a delay wave and an impulse response spread of the frequency domain equalization, wherein:
- the part of the signal sequence is selected in the selected period.

* * * * *